(12) United States Patent
Abe et al.

(10) Patent No.: US 9,512,371 B2
(45) Date of Patent: Dec. 6, 2016

(54) SUPPORT FOR HYDROCRACKING CATALYST OF HYDROCARBON OIL, HYDROCRACKING CATALYST, AND METHOD FOR HYDROCRACKING OF HYDROCARBON OIL

(75) Inventors: Masaki Abe, Saitama (JP); Akira Takaya, Saitama (JP); Hiroshi Munakata, Saitama (JP)

(73) Assignee: COSMO OIL CO., LTD., Tokyo (JP)

( * ) Notice: Subject to any disclaimer, the term of this patent is extended or adjusted under 35 U.S.C. 154(b) by 1007 days.

(21) Appl. No.: 13/377,023

(22) PCT Filed: Jul. 16, 2010

(86) PCT No.: PCT/JP2010/062116
§ 371 (c)(1),
(2), (4) Date: Dec. 8, 2011

(87) PCT Pub. No.: WO2011/021459
PCT Pub. Date: Feb. 24, 2011

(65) Prior Publication Data
US 2012/0085681 A1 Apr. 12, 2012

(30) Foreign Application Priority Data

Aug. 21, 2009 (JP) .................................. 2009-192087

(51) Int. Cl.
| | | |
|---|---|---|
| *C10G 47/02* | (2006.01) | |
| *C10G 47/16* | (2006.01) | |
| *B01J 21/06* | (2006.01) | |
| *B01J 23/28* | (2006.01) | |
| *B01J 23/883* | (2006.01) | |
| *B01J 29/08* | (2006.01) | |
| *B01J 35/02* | (2006.01) | |
| *B01J 37/02* | (2006.01) | |
| *C10G 47/18* | (2006.01) | |
| *C10G 47/20* | (2006.01) | |

(52) U.S. Cl.
CPC ............. *C10G 47/16* (2013.01); *B01J 21/063* (2013.01); *B01J 23/28* (2013.01); *B01J 23/883* (2013.01); *B01J 29/08* (2013.01); *B01J 29/085* (2013.01); *B01J 35/023* (2013.01); *B01J 37/0201* (2013.01); *C10G 47/02* (2013.01); *C10G 47/18* (2013.01); *C10G 47/20* (2013.01); *B01J 2229/20* (2013.01); *B01J 2229/37* (2013.01); *B01J 2229/40* (2013.01); *C10G 2300/1096* (2013.01); *C10G 2300/301* (2013.01); *C10G 2400/02* (2013.01)

(58) Field of Classification Search
CPC ......... C10G 47/16; C10G 47/20; C10G 47/18; C10G 47/02; C10G 2300/301; C10G 2300/1096; C10G 2400/02; B01J 37/0201; B01J 29/085; B01J 23/28; B01J 29/08; B01J 35/023; B01J 21/063; B01J 23/883; B01J 29/166; B01J 29/146; B01J 29/126; B01J 29/106; B01J 29/088; B01J 29/084
See application file for complete search history.

(56) References Cited

U.S. PATENT DOCUMENTS

| | | | | |
|---|---|---|---|---|
| 6,093,672 A | * | 7/2000 | Winquist ............... | B01J 29/126 423/325 |
| 2006/0073963 A1 | * | 4/2006 | Creyghton ............. | C10G 47/02 502/64 |
| 2009/0118556 A1 | * | 5/2009 | Euzen et al. .................. | 585/251 |
| 2009/0283443 A1 | * | 11/2009 | Kuroda et al. ............. | 208/111.1 |

FOREIGN PATENT DOCUMENTS

| | | | |
|---|---|---|---|
| JP | 3341011 B2 | | 8/2002 |
| JP | 2002-255537 A | | 9/2002 |
| JP | 2003-226519 A | | 8/2003 |
| JP | PCT/JP2006/317612 | * | 3/2008 |
| JP | 2008-127542 A | | 6/2008 |
| WO | WO 2007032232 A1 | | 3/2007 |

OTHER PUBLICATIONS

International Search Report (PCT/ISA/210) issued on Oct. 19, 2010 in the International Patent Application No. PCT/JP2010/062116.
Written Opinion (PCT/ISA/237) issued on Oct. 19, 2010 in the International Patent Application No. PCT/JP2010/062116.

* cited by examiner

*Primary Examiner* — Randy Boyer
*Assistant Examiner* — Juan Valencia
(74) *Attorney, Agent, or Firm* — Sughrue Mion, PLLC

(57) ABSTRACT

A support for hydrocracking catalyst of hydrocarbon oil, which comprises a modified zeolite obtained by incorporating titanium into a faujasite-type zeolite, wherein the modified zeolite satisfies conditions (a) to (e) as described, and to a hydrocracking catalyst employing the support and a method for hydrocracking of hydrocarbon oil containing aromatics using the catalyst.

3 Claims, No Drawings

SUPPORT FOR HYDROCRACKING CATALYST OF HYDROCARBON OIL, HYDROCRACKING CATALYST, AND METHOD FOR HYDROCRACKING OF HYDROCARBON OIL

TECHNICAL FIELD

The present invention relates to a zeolite-based support for use in the hydrocracking of hydrocarbon oil, hydrocracking catalyst of hydrocarbon oil employing the support, and a method for hydrocracking of hydrocarbon oil in which the catalyst is used to produce a high-quality gasoline basestock and petrochemical feedstocks.

BACKGROUND ART

Since environmental regulations are becoming stricter in recent years, hydrocracking catalysts are in extensive use as functional materials for producing high-quality clean fuels in the petroleum refining industry. Meanwhile, the crude oil which are being excavated are shifting to heavier oil, and the performances required of petroleum refining catalysts including hydrocracking catalysts are becoming higher year by year. In general, many of the kerosene and gas oil fractions obtained from heavy crude oil have a high aromatic hydrocarbon compound content and a high nitrogen content. It is known that these components accelerate coke deposition on the catalysts and cause deactivation of the hydrocracking catalysts.

As a result of a decrease in the demand for heavy oil and the like, the throughput in fluid catalytic cracking unit (FCC unit) and cokers has increased and the amount of the LCO (cycle oil from catalytic cracking unit) and coker cracking gas oil yielded in these units are increasing accordingly. There is a growing desire for conversion of these fractions into a useful gasoline basestock, petrochemical feedstocks, and the like through hydrocracking.

Under such circumstances, many investigations on zeolites, which are active ingredients for cracking of hydrocarbon oil, are recently being made with respect to improvements in the properties and compositions of zeolites, addition of a metal or other substance to zeolites, etc. Results of the development of novel hydrocracking catalysts have been reported.

For example, patent document 1 discloses a catalyst obtained by supporting metal having hydrotreating activity on zeolite support obtained by incorporating titania into zeolite and preparing so as to have a specific aluminum/silicon atomic ratio.

Patent document 2 discloses a catalyst obtained by supporting a metal having hydrotreating activity on zeolite support which has a specific aluminum/silicon atomic ratio and to which mesopores having a pore diameter of 50-1,000 Å have been imparted. Furthermore, patent document 3 discloses a catalyst including zeolite support which has a specific lattice constant and a specific aluminum/silicon atomic ratio and into which a metallic element in Group 4 of the periodic table has been incorporated.

PRIOR-ART DOCUMENTS

Patent Documents

Patent Document 1: Japanese Patent No. 3341011, specification
Patent Document 2: JP-A-2002-255537
Patent Document 3: JP-A-2003-226519

SUMMARY OF THE INVENTION

Problems that the Invention is to Solve

However, LCO and the like contain aromatic compounds in a large amount and are known to cause a decrease in catalytic activity. Although catalyst improvements such as an improvement in yield and an improvement in selectivity to a desired product have been attempted hitherto as described in the patent documents, substantially no investigations on catalyst life have been made so far. Furthermore, since it is necessary to conduct reaction at a high temperature and a high hydrogen partial pressure for inhibiting deactivation, there are problems concerning an increase in the amount of by-products, e.g., off-gas, an increase in hydrogen consumption, necessity of an expensive high-pressure apparatus, etc.

If it becomes possible to stably hydrocrack the kerosene or gas oil fraction obtained from heavy crude oil, LCO, or coker gas oil over a prolonged period, restrictions on the kinds of feedstock oil are relieved and the efficiency of the refining step in refineries is heightened. In addition, production of various products, e.g., fuel oil, which is suitable for a supply-demand balance is rendered possible.

An object of the invention is to provide, under such circumstances, a support which can give a zeolite-based hydrocracking catalyst that has a stable catalyst life and shows high cracking activity over a long period. Another object is to provide a hydrocracking catalyst employing the support. Still another object is to provide a method for hydrocracking of hydrocarbon oil containing aromatic hydrocarbon compounds using the catalyst.

Means for Solving the Problems

The present inventors diligently made investigations in order to accomplish the objects. As a result, the inventors have found that a catalyst employing a support which includes as the main component a modified zeolite obtained by incorporating titanium into a faujasite-type zeolite and having specific properties shows excellent activity in the hydrocracking of feedstock oil containing aromatics and has a long catalyst life. The invention has been thus completed.

Namely, the invention provides the following support for a hydrocracking catalyst, the following hydrocracking catalyst employing the support, and the following method for hydrocracking using the hydrocracking catalyst.

(1) A support for a catalyst for hydrocracking of hydrocarbon oil, which comprises a modified zeolite obtained by incorporating titanium into a faujasite-type zeolite, wherein the modified zeolite satisfies the followings (a) to (e):

(a) the modified zeolite has a titanium content of 1-17% by mass in terms of metal oxide amount, (b) the modified zeolite contains aluminum and silicon in an Al/Si atomic ratio of 0.14-0.35, (c) the modified zeolite has a lattice constant of 24.36-24.48 Å (angstrom), (d) the modified zeolite has a degree of crystallinity of 30-95%, and (e) the modified zeolite has a specific surface area of 500-850 $m^2/g$.

(2) A catalyst for hydrocracking of hydrocarbon oil, which comprises: the support according to (1) above; and at least one selected from Group 8 metals and Group 6 metals of the long-form periodic table, in an amount of 0.5-30% by mass in terms of metal oxide amount based on the catalyst.

(3) A method for hydrocracking of hydrocarbon oil, which comprises hydrocracking hydrocarbon oil which has a boiling-point range of 120-380° C. and comprises aromatic hydrocarbon compounds in an amount of 30-100% by mass, by using the hydrocracking catalyst according to (2) above.

Effects of the Invention

The catalyst employing the support for a hydrocracking catalyst according to the invention has a long catalyst life and high hydrocracking activity and enables feedstock oil containing aromatic hydrocarbon compounds in a large amount to be hydrocracked. An increased number of kinds of feedstock oil can be treated with the catalyst, which contributes to an improvement in the efficiency of the step of refining in refineries. The product oil obtained include a high-quality gasoline fraction having a high octane number and petrochemical feedstocks, e.g., xylene, and the catalyst has a considerable technical significance.

Such excellent performance of the catalyst employing the support according to the invention is thought to be attributable mainly to the fact that the support according to the invention is a modified zeolite in which the Al/Si atomic ratio (ratio of aluminum atoms to silicon atoms) has been prepared to a value within a given range that is different from those for conventional modified zeolite supports as will be described later.

MODES FOR CARRYING OUT THE INVENTION

The invention will be explained below in detail.
[Support for Hydrocracking Catalyst]

The support for hydrocracking catalyst of hydrocarbon oil according to the invention (hereinafter referred to also as "support according to the invention") includes as the main component a modified zeolite obtained by incorporating titanium into a faujasite-type zeolite.

Examples of the faujasite-type zeolite include zeolite X, zeolite Y, and ultra stabilized Y zeolite (ultra stable Y; USY). In the invention, USY zeolite is preferred as the faujasite-type zeolite to be used as a starting material for the modified zeolite. The Al/Si atomic ratio of the USY zeolite to be used as a starting material is not particularly limited. However, USY zeolite having an Al/Si atomic ratio of 0.2-0.5 is generally used.

It is preferred that the cations of the faujasite-type zeolite should be hydrogen ions or ammonium ions, and hydrogen ions are especially effective. Meanwhile, a lower sodium ion content is preferred, and it is desirable that the content of sodium ions in terms of $Na_2O$ should be 0.7% by mass or less, preferably 0.5% by mass or less.

The modified zeolite in the invention is a zeolite obtained by incorporating titanium into such a faujasite-type zeolite. In the invention, although zirconium or hafnium can be incorporated, titanium is suitable for use. The content of titanium in this modified zeolite is 1-17% by mass, preferably 1-10% by mass, in terms of metal oxide amount, i.e., $TiO_2$ amount, based on the modified zeolite.

By preparing the content of titanium to 1% by mass or higher, the metal having hydrotreating activity, which will be described later, can be supported with high dispersion on the support and the catalyst thus obtained can be made to retain hydrocracking activity and a catalyst life. So long as the content of titanium is 17% by mass or less, the zeolite is inhibited from being reduced in specific surface area by covering the surface with titanium. As a result, the catalyst obtained can retain hydrocracking activity.

The modified zeolite in the invention has an Al/Si atomic ratio of 0.14-0.35, preferably 0.15-0.30. The Al/Si atomic ratio can be prepared by moderately dealuminating the starting-material faujasite-type zeolite by controlling the contact conditions under which an acidic aqueous solution containing titanium salt is brought into contact with the faujasite-type zeolite. In the invention, by preparing the Al/Si atomic ratio of the modified zeolite to 0.14 or greater, the aluminum present in the modified zeolite is inhibited from being excessively eliminated and, simultaneously therewith, the zeolite structure is inhibited from breaking and decreasing in the degree of crystallinity and in specific surface area. As a result, a support which can give a catalyst capable of retaining hydrocracking activity and a catalyst life is obtained. By regulating the Al/Si atomic ratio to 0.35 or less, the modified zeolite is inhibited from decreasing in titanium content as the progress of dealumination of the modified zeolite. As a result, a support which can give a catalyst capable of retaining a catalyst life is obtained.

As described above, the modified zeolite in the invention has an Al/Si atomic ratio in the range of 0.14-0.35 and a lattice constant in the range of 24.36 Å to 24.48 Å. The lower limit thereof is preferably 24.37 Å or more. The upper limit thereof is preferably 24.47 Å or less. By preparing the lattice constant thereof to 24.36 Å or more, the zeolite structure is inhibited from being damaged and thereby reducing catalytic performance. By preparing the lattice constant thereof to 24.48 Å or less, the trouble that the effect of maintaining catalytic performance is rendered rather saturated due to too large lattice constant is avoided and catalytic performance can be effectively maintained.

The lattice constant of the modified zeolite can be determined by X-ray diffraction analysis (XRD analysis). A method for this examination is described in ASTM D3942-97, and the lattice constant is determined through an examination according to this method in the invention.

The modified zeolite in the invention has a degree of crystallinity of 30% to 95%, preferably 40% or higher. The degree of crystallinity of the modified zeolite can be determined by XRD analysis. A method for this examination is described in ASTM D3906-97, and the degree of crystallinity is determined through an examination according to this method in the invention. In this method, the degree of crystallinity is determined in terms of relative value with respect to reference faujasite.

The degree of crystallinity is an important index to the cracking activity attributable to the zeolite. The larger the value thereof, the higher the proportion of the zeolite structure which has been maintained. Upon replacement with hydrogen ions, such zeolite has improved cracking activity. By preparing the degree of crystallinity to 30% or higher, the zeolite structure can be inhibited from disintegrating and thereby reducing catalytic performance. The higher the degree of crystallinity, the more the modified zeolite is preferred. However, since the modification of the zeolite with titanium causes damage to some of the zeolite structure, the degree of crystallinity is usually in the range of 30-95%.

Furthermore, the modified zeolite in the invention has a specific surface area of 500-850 $m^2/g$, preferably 600-850 $m^2/g$. By preparing the specific surface area thereof to a value within that range, a catalyst having excellent long-term stability and high hydrocracking performance can be obtained. So long as the specific surface area thereof is 500 $m^2/g$ or more, it is easy to sufficiently dispersedly support the metal having hydrotreating activity which will be described later. The specific surface area can be measured by a nitrogen adsorption method (BET method).

[Process for Producing Support for Hydrocracking Catalyst]

A process for producing the support according to the invention is described below in detail.

The modified zeolite serving as the main component of the support of the invention can be obtained by incorporating titanium into a faujasite-type zeolite. Examples of methods for incorporating titanium include a method in which an acidic aqueous solution containing titanium salt is brought into contact with the faujasite-type zeolite described above.

Thus, a titanium-containing faujasite-type zeolite, i.e., a modified zeolite, can be obtained. As titanium salt in this method, a salt in an inorganic acid or organic acid can be used. In the case of a salt in an inorganic acid, use can be made of salt of sulfuric, salt of nitric acid, chloride, or the like. In the case of a salt in an organic acid, use can be made of salt of acetic acid, salt of citric acid, salt of malonic acid, salt of succinic acid, or the like.

When the acidic aqueous solution containing titanium salt is brought into contact with a faujasite-type zeolite, the concentration of titanium in the acidic aqueous solution is determined in accordance with the temperature and period to be used for the contact. For example, in the case where the treatment conditions include 30° C. and 4 hours, a concentration of 0.001-0.025 mol/L, preferably 0.01-0.02 mol/L, is selected. The pH of the aqueous solution in this case is adjusted to 1.3-3.0, preferably 1.5-2.5.

When the acidic aqueous solution containing titanium salt is brought into contact with a faujasite-type zeolite in order to incorporate titanium into the faujasite-type zeolite, the solution and the zeolite may be kept being stirred together or may be kept still without raising particular difficulties so long as the starting-material faujasite-type zeolite is in the state of having been evenly dispersed in the acidic aqueous solution containing a salt of titanium. As a result of the contact of the starting-material faujasite-type zeolite with the acidic aqueous solution containing titanium salt, the contact being performed under those conditions, some of the aluminum contained in the starting-material zeolite is eliminated to a desired degree and titanium is incorporated into the zeolite to a desired degree.

After the contact of the acidic aqueous solution containing titanium salt with the starting-material faujasite-type zeolite, the zeolite and the aqueous solution can be subjected to solid-liquid separation by means of filtration or centrifugal separation. It is preferred that the solid zeolite obtained by this separation should be washed with water and then dried and calcined.

It is preferred that water heated to 30-70° C. should be used for the washing of the solid because an enhanced cleaning effect is obtained. The drying is conducted in air or in a nitrogen stream generally at 20-150° C., preferably at 50-140° C. The calcination is conducted in an air stream for about 1-10 hours generally at 400-700° C., preferably at 450-650° C. However, conditions of calcination are suitably selected while taking account of use conditions for the catalyst employing as a support the modified zeolite to be obtained.

Thus, a modified zeolite can be obtained.

The support according to the invention may be the modified zeolite itself, or may be a support obtained by adding a binder to the modified zeolite and molding the mixture. In the case where a binder is added and the mixture is molded and used, use may be made of a method in which the solid obtained by solid-liquid separation conducted after the contact of the acidic aqueous solution containing titanium salt with a starting-material faujasite-type zeolite is washed with water and molded together with a binder added thereto and the resultant molded product is dried and calcined under the same conditions as described above. Examples of the binder include alumina, silica-alumina, silica, zirconia, boria, and alumina-boria. Preferred examples thereof include alumina, silica-alumina, silica, boria, and alumina-boria. The alumina to be used may be any of various kinds of alumina including α-alumina, β-alumina, γ-alumina, δ-alumina, and hydrated alumina. However, alumina which is porous and has a large specific surface area is preferred, and γ-alumina is especially preferred. The content of the binder is 10-70% by mass, preferably 15-65% by mass, based on the whole support. In case where the content of the binder is too high, the performance of the catalyst cannot be sufficiently exhibited. In case where the content thereof is too low, the catalyst tends to have reduced physical strength. Consequently, a content is selected in accordance with the purpose.

[Hydrocracking Catalyst]

The hydrocracking catalyst according to the invention is a catalyst obtained by incorporating at least one metal having hydrotreating activity selected from Group 8 metals and Group 6 metals of the long-form periodic table into the support for a hydrocracking catalyst described above according to the invention.

At least one Group 8 metal, among the metals having hydrotreating activity which may be incorporated, is selected from iron, nickel, cobalt, ruthenium, rhodium, palladium, osmium, iridium, and platinum. At least one Group 6 metal, among those metals, is selected from chromium, molybdenum, and tungsten. Usually, at least one metal is selected preferably from nickel, cobalt, and molybdenum among those metals.

Methods for incorporating metal having hydrotreating activity into the support are not particularly limited. For example, it is preferred to employ a method in which a solution containing metal salt having hydrotreating activity is impregnated with the support. Also usable are an equilibrium adsorption method, pore-filling method, incipient-wetness method, and the like.

The pore-filling method, for example, is a method in which the pore volume of the support is measured beforehand and metal salt solution used in the same volume as the pore volume is impregnated into the support. However, impregnation methods are not particularly limited, and an impregnation method is suitably selected in accordance with metal content and the properties of the support.

The content of the metal having hydrotreating activity is 0.5-30% by mass in terms of metal oxide amount based on the catalyst. So long as the amount of the supported metal having hydrotreating activity is 0.5% by mass or more, this amount is sufficient for producing the effect attributable to the metal having hydrotreating activity. So long as the amount of the metal is 30% by mass or less, aggregates of a compound of the metal having hydrotreating activity do not generate in the step of impregnating (supporting) the metal having hydrotreating activity, and the metal having hydrotreating activity is satisfactorily dispersed, resulting in an improvement in hydrocracking activity.

There are cases where a desirable range of the content of the metal having hydrotreating activity slightly differs between noble metals and base metals. The desirable range in the case of noble metals may be such that the lower-limit value thereof is 0.5% by mass, preferably 0.7% by mass, in terms of metal oxide amount based on the catalyst and the upper-limit value thereof is 5% by mass, preferably 3% by mass, in terms of metal oxide amount based on the catalyst. The desirable range in the case of base metals may be such that the lower-limit value thereof is 0.5% by mass, preferably 1% by mass, in terms of metal oxide amount based on the catalyst and the upper-limit value thereof is 30% by mass, preferably 20% by mass, in terms of metal oxide amount based on the catalyst.

With respect to treatments after incorporation of the active metal into the support, it is preferred to conduct drying and calcination.

The drying is conducted in air or in a nitrogen stream generally at 20-150° C., preferably at 50-120° C. The calcination is conducted in an air stream for about 1-10 hours generally at 400-700° C., preferably at 450-650° C. However, conditions of calcination are suitably selected while taking account of use conditions for the catalyst to be obtained.

[Method for Hydrocracking of Hydrocarbon Oil]

The hydrocracking catalyst according to the invention can be applied to the hydrocracking of various hydrocarbon feedstocks. However, the hydrocracking catalyst can be advantageously used especially in the hydrocracking of a kerosene fraction or a gas oil fraction which has a high aromatic hydrocarbon compound content. In particular, when the hydrocracking catalyst is used in the hydrocracking of hydrocarbon oil having a boiling point range of 120-380° C. and containing at least 30% by mass aromatic hydrocarbon compounds, it is possible to stably obtain a gasoline basestock or petrochemical feedstocks, e.g., benzene, toluene, and xylene, over a long period without requiring the use of severer operating conditions.

Any hydrocarbon oil fraction having that boiling point range and containing at least 30% by mass aromatic hydrocarbon compounds can be advantageously hydrocracked using the hydrocracking catalyst of the invention, regardless of the process by which the fraction was produced. In case where a feedstock having a boiling point range exceeding 380° C. is used, coke deposition on the catalyst occurs in an increased amount to cause deactivation of cracking. Use of such a feedstock hence is undesirable. Incidentally, distillation characteristics can be measured by the method described in JIS K 2254.

The term "aromatic hydrocarbon compounds" in the invention means monocyclic aromatic hydrocarbon compounds or polycyclic aromatic hydrocarbon compounds, and the aromatic hydrocarbon compounds may be a mixture of both. The kinds of the aromatic hydrocarbon compounds are not particularly limited. Examples of the monocyclic aromatic hydrocarbon compounds include xylene, trimethylbenzene, tetramethylbenzene, propylbenzene, ethylmethylbenzene, diethylbenzene, indane, and methylindanes. Examples of the polycyclic aromatic hydrocarbon compounds include naphthalene compounds such as naphthalene, methylnaphthalene, ethylnaphthalene, dimethylnaphthalene, and trimethylnaphthalene, anthracene compounds, and phenanthrene compounds.

The catalyst of the invention shows stable hydrocracking activity over a long period even when the hydrocarbon feedstock has an aromatic hydrocarbon compound content of 30% by mass or higher. The higher the aromatic hydrocarbon compound content in the feedstock, the higher the aromatic hydrocarbon compound content in the gasoline fraction to be obtained. In general, aromatic hydrocarbon compounds are an excellent gasoline basestock from the standpoints of having a high octane number and having a high calorific value. The gasoline basestock thus obtained contains benzene, toluene, xylene, and the like. These compounds can hence be separately extracted and used as starting materials in the chemical industry.

Consequently, in the method for hydrocracking of hydrocarbon oil according to the invention, in which the catalyst of the invention is used, the content of aromatic hydrocarbon compounds in the hydrocarbon oil feedstock is 30-100% by mass, preferably 40-100% by mass. Nonaromatic hydrocarbon compounds may be present therein, and examples thereof include hydrocarbon compounds such as paraffins, naphthenes, and olefins and sulfur compounds such as thiophene and benzothiophene.

Examples of the feedstock to be used in the hydrocracking method of the invention include LCO obtained from fluid catalytic cracking unit (FCC unit), coker cracking gas oil obtained from coker unit, bottom oil obtained from catalytic reforming unit, and cracked light oil generated from a vacuum gas oil desulfurization unit or atmospheric residue desulfurization unit.

When hydrocracking is conducted using the catalyst of the invention, reaction conditions including a temperature of 330-450° C., preferably 350-440° C., and a hydrogen partial pressure of 3 MPa to 16 MPa, preferably 4 MPa to 12 MPa, are usually selected. With respect to methods for bringing the catalyst and the hydrocarbon oil feedstock into contact with each other in this hydrocracking, use can be made of various methods such as, for example, a fixed-bed flow-through method, a fluidized-bed method, and a moving-bed method. However, it is preferred to conduct the hydrocracking by a fixed-bed flow-through method when ease of operation is taken into account.

In the case where the hydrocracking is conducted with a flow-through type reactor, the hydrogen/hydrocarbon ratio is generally 100-10,000 $Nm^3/kL$, preferably 200-5,000 $Nm^3/kL$, more preferably 300-3,000 $Nm^3/kL$. The liquid hourly space velocity (LHSV) in this hydrocracking is 0.05-10 $h^{-1}$, preferably 0.1-5 $h^{-1}$, more preferably 0.2-3 $h^{-1}$.

Representative properties of the gasoline fraction to be obtained by the hydrocracking are as follows. The yield of the fraction is 45-65%, and the yield of xylene is 4-8%. The gasoline fraction has a research octane number (RON) of 87-93 and a sulfur content of 10 ppm by mass or less.

When the hydrocracking of a feedstock is conducted, the hydrocracking catalyst of the invention can be used alone. However, in the case where the hydrocarbon oil feedstock contains sulfur, it is possible to conduct a desulfurization step as a pretreatment step or a post-treatment step in order to diminish the sulfur. In this case, a commercial desulfurization catalyst such as a CoMo alumina or NiMo alumina catalyst can be used. The desulfurization catalyst is not particularly limited in the amount of the metal having hydrotreating activity, loading ratio, etc., and these factors are suitably selected according to applications of the product oil to be obtained.

EXAMPLES

The invention will be explained below by reference to Examples and Comparative Examples, but the invention should not be construed as being limited to the range of the Examples.

Modified-Zeolite Preparation Examples

Example 1

As a starting-material zeolite, use was made of a powder of zeolite USY having an Si/Al atomic ratio of 0.33 (average particle diameter, 3.5 μm; proportion of particles having a particle diameter of 6 μm or less in all zeolite particles, 87%).

Into a 3-L flask made of glass were introduced 2.5 L of ion-exchanged water and 7 mL of a 30% by mass aqueous solution of titanium(IV) sulfate (titanium concentration after preparation, 0.005 mol/L). The contents were heated to 30° C., and 60 g of the zeolite USY was added thereto with stirring. The aqueous solution at this point of time had a pH of 2.2. The mixture was stirred for 4 hours. Thereafter, the slurry was subjected to separation by filtration, and the solid matter was washed with 3 L of water heated to 50° C.

The zeolite cake obtained was dried at 120° C. for 3 hours. After the drying, the zeolite was calcined in an air stream (250 mL/min) at 500° C. for 3 hours to obtain modified zeolite A. The composition and properties of the modified zeolite A are shown in Table 1. The methods and analytical apparatus used for determining the property values shown in Table 1 are shown below.

[Composition Analysis]

The composition of a catalyst was determined using plasma-emission spectroscopic apparatus (ICP) "IRIS Advantage", manufactured by Thermo ELECTRON CORPORATION.

[Determination of Lattice Constant and Degree of Crystallinity]

Using a X-ray powder diffraction analyzer (Ultima IV, manufactured by Rigaku Corp.), an examination was made under the conditions of an X-ray source of CuKα, an output of 40 kV, and 40 mA. Lattice constant was calculated by a method according to ASTM D3942-97. The degree of crystallinity was calculated by a method according to ASTM D3906-97.

Comparative Example 1

A modified zeolite was prepared in the same method as in Example 1, except that a 30% by mass aqueous solution of titanium(IV) sulfate was used in an amount of 44 mL (titanium concentration after preparation, 0.03 mol/L). Thus, comparative modified zeolite a was obtained. At the time when the zeolite USY had been added, the aqueous solution had a pH of 1.4. The composition and properties of the comparative modified zeolite a are shown in Table 1.

Comparative Example 2

A modified zeolite was prepared in the same method as in Example 1, except that a 30% by mass aqueous solution of titanium(IV) sulfate was used in an amount of 3 mL (titanium concentration after preparation, 0.002 mol/L). Thus, comparative modified zeolite b was obtained. At the time when the zeolite USY had been added, the aqueous solution had a pH of 2.7. The composition and properties of the comparative modified zeolite b are shown in Table 1.

TABLE 1

Compositions and properties of modified zeolites

| | Modified zeolite | Al (mass %) | Si (mass %) | $TiO_2$ (mass %) | Al/Si (atomic ratio) | Lattice constant (Å) | Degree of crystallinity (%) | Specific surface area ($m^2/g$) |
|---|---|---|---|---|---|---|---|---|
| (Starting-material USY) | | 9.5 | 29.6 | — | 0.334 | 24.47 | 100 | 793 |
| Example 1 | A | 8.6 | 30.6 | 1.2 | 0.294 | 24.45 | 77 | 762 |
| Example 2 | B | 7.7 | 32.1 | 2.3 | 0.249 | 24.44 | 62 | 787 |
| Example 3 | C | 5.8 | 34.3 | 4.7 | 0.176 | 24.41 | 49 | 749 |
| Comparative Example 1 | a | 2.8 | 38.0 | 8.1 | 0.076 | 24.32 | 16 | 127 |
| Comparative Example 2 | b | 9.1 | 29.6 | 0.5 | 0.321 | 24.46 | 89 | 772 |

[Determination of Specific Surface Area (SA)]

Specific surface area was determined by the BET method based on nitrogen adsorption. As an apparatus for nitrogen adsorption, use was made of a surface area measuring apparatus (BELSORP-mini) manufactured by BEL Japan, Inc.

Example 2

A modified zeolite was prepared in the same method as in Example 1, except that a 30% by mass aqueous solution of titanium(IV) sulfate was used in an amount of 15 mL (titanium concentration after preparation, 0.01 mol/L). Thus, modified zeolite B was obtained. At the time when the zeolite USY had been added, the aqueous solution had a pH of 1.9. The composition and properties of the modified zeolite B are shown in Table 1.

Example 3

A modified zeolite was prepared in the same method as in Example 1, except that a 30% by mass aqueous solution of titanium(IV) sulfate was used in an amount of 29 mL (titanium concentration after preparation, 0.02 mol/L). Thus, modified zeolite C was obtained. At the time when the zeolite USY had been added, the aqueous solution had a pH of 1.8. The composition and properties of the modified zeolite C are shown in Table 1.

Hydrocracking Catalyst Preparation Examples

Example 4

To 30.1 g of the modified zeolite A obtained in Example 1 were added 40.0 g of boehmite and 36.0 g of water. The resultant mixture was kneaded for 1 hour. This kneaded mixture was extruded with an extruder into a cylindrical shape having a diameter of 1.6 mm and then dried at 120° C. for 2 hours. After the drying, the extrudate was calcined in an air stream (250 mL/min) at 550° C. for 2 hours to obtain a molded product. 20 g of this molded product was introduced into an eggplant flask, and an impregnation solution containing 1.3 g of hexaammonium molybdate tetrahydrate was injected into the flask while conducting degassing with a rotary evaporator. The impregnated sample was dried at 120° C. for 2 hours. After the drying, the sample was calcined in an air stream (250 mL/min) at 550° C. for 2 hours to obtain catalyst A. The composition of the catalyst A is shown in Table 2.

Example 5

Catalyst B was obtained in the same method as in Example 4, except that the modified zeolite B obtained in Example 2 was used. The composition of the catalyst B is shown in Table 2.

Example 6

Catalyst C was obtained in the same method as in Example 4, except that the modified zeolite C obtained in Example 3 was used. The composition of the catalyst C is shown in Table 2.

Example 7

To 30.1 g of the modified zeolite C obtained in Example 3 were added 40.0 g of boehmite and 36.0 g of water. The resultant mixture was kneaded for 1 hour. This kneaded mixture was extruded with an extruder into a cylindrical shape having a diameter of 1.6 mm and then dried at 120° C. for 2 hours. After the drying, the extrudate was calcined in an air stream (250 mL/min) at 550° C. for 2 hours to obtain a molded product. 20 g of this molded product was introduced into an eggplant flask, and an impregnation solution containing 1.0 g of hexaammonium molybdate tetrahydrate and 0.8 g of nickel(II) nitrate hexahydrate was injected into the flask while conducting degassing with a rotary evaporator. The impregnated sample was dried at 120° C. for 2 hours. After the drying, the sample was calcined in an air stream (250 mL/min) at 550° C. for 2 hours to obtain catalyst D. The composition of the catalyst D is shown in Table 2.

Comparative Example 3

Comparative catalyst a was obtained in the same method as in Example 4, except that the comparative modified zeolite a obtained in Comparative Example 1 was used. The composition of the comparative catalyst a is shown in Table 2.

Comparative Example 4

Comparative catalyst b was obtained in the same method as in Example 4, except that the comparative modified zeolite b obtained in Comparative Example 2 was used. The composition of the comparative catalyst b is shown in Table 2.

Comparative Example 5

The same starting-material zeolite as in Example 1 was used in an amount of 30.1 g. Thereto were added 40.0 g of boehmite and 36.0 g of water. The resultant mixture was kneaded for 1 hour. This kneaded mixture was extruded with an extruder into a cylindrical shape having a diameter of 1.6 mm and then dried at 120° C. for 2 hours. After the drying, the extrudate was calcined in an air stream (250 mL/min) at 550° C. for 2 hours to obtain a molded product. 20 g of this molded product was introduced into an eggplant flask, and an impregnation solution containing 1.0 g of hexaammonium molybdate tetrahydrate and 0.8 g of nickel(II) nitrate hexahydrate was injected into the flask while conducting degassing with a rotary evaporator. The impregnated sample was dried at 120° C. for 2 hours. After the drying, the sample was calcined in an air stream (250 mL/min) at 550° C. for 2 hours to obtain comparative catalyst c. The composition of the comparative catalyst c is shown in Table 2.

Example 8

Catalyst E was obtained in the same method as in Example 7, except that use was made of an impregnation solution containing 0.6 g of hexaammonium molybdate tetrahydrate and 0.5 g of nickel(II) nitrate hexahydrate. The composition of the catalyst E is shown in Table 2.

Example 9

Catalyst F was obtained in the same method as in Example 7, except that use was made of an impregnation solution containing 2.2 g of hexaammonium molybdate tetrahydrate and 1.8 g of nickel(II) nitrate hexahydrate. The composition of the catalyst F is shown in Table 2.

Example 10

Catalyst G was obtained in the same method as in Example 7, except that use was made of an impregnation solution containing 5.0 g of hexaammonium molybdate tetrahydrate and 4.0 g of nickel(II) nitrate hexahydrate. The composition of the catalyst G is shown in Table 2.

Example 11

Catalyst H was obtained in the same method as in Example 7, except that use was made of an impregnation solution containing 0.61 g of hexaammonium molybdate tetrahydrate and 0.52 g of cobalt(II) carbonate hexahydrate. The composition of the catalyst H is shown in Table 2.

Comparative Example 6

Comparative catalyst d was obtained in the same method as in Example 7, except that use was made of an impregnation solution containing 0.05 g of hexaammonium molybdate tetrahydrate. The composition of the comparative catalyst d is shown in Table 2.

TABLE 2

| | | Compositions of catalysts | | | | | |
| --- | --- | --- | --- | --- | --- | --- | --- |
| | Catalyst | $Al_2O_3$ (mass %) | $SiO_2$ (mass %) | $TiO_2$ (mass %) | NiO (mass %) | CoO (mass %) | $MoO_3$ (mass %) |
| Example 4 | A | 56.4 | 38.4 | 0.6 | — | — | 4.5 |
| Example 5 | B | 55.8 | 38.5 | 1.2 | — | — | 4.5 |
| Example 6 | C | 54.5 | 38.6 | 2.3 | — | — | 4.6 |
| Example 7 | D | 55.4 | 37.7 | 2.3 | 1.0 | — | 3.6 |
| Example 8 | E | 56.3 | 38.3 | 2.3 | 0.6 | — | 2.4 |
| Example 9 | F | 52.4 | 35.7 | 2.2 | 2.0 | — | 8.2 |
| Example 10 | G | 47.9 | 32.6 | 2.0 | 4.0 | — | 16.2 |
| Example 11 | H | 56.2 | 38.3 | 2.3 | — | 0.6 | 2.4 |
| Comparative Example 3 | a | 49.9 | 41.1 | 4.1 | — | — | 4.5 |

TABLE 2-continued

| | | Compositions of catalysts | | | | | |
|---|---|---|---|---|---|---|---|
| | Catalyst | Al$_2$O$_3$ (mass %) | SiO$_2$ (mass %) | TiO$_2$ (mass %) | NiO (mass %) | CoO (mass %) | MoO$_3$ (mass %) |
| Comparative Example 4 | b | 52.0 | 43.4 | 0.2 | — | — | 4.5 |
| Comparative Example 5 | c | 57.0 | 38.3 | — | 1.0 | — | 4.1 |
| Comparative Example 6 | d | 57.9 | 39.4 | 2.3 | — | — | 0.2 |

Hydrocracking of Cycle Oil from Catalytic Cracking Unit (LCO)

Example 12

Using catalysts A, B, C, D, E, F, G, H, a, b, c, and d, which had been prepared in Examples 4 to 11 and Comparative Examples 3 to 6 given above, the feedstock oil shown below was hydrocracked in the following steps.

First, 20 mL of each of the catalysts was loaded into a high-pressure flow-through type reactor (inner diameter, 15 mm), and 20 mL of a desulfurization catalyst (CoMo alumina) as a preceding catalyst was loaded so as to overlie that catalyst. Thus, a fixed-bed catalyst layer was formed. Subsequently, a fluid mixture composed of the feedstock oil and a hydrogen-containing gas and heated to the reaction temperature was introduced through an upper part of the reactor to allow a hydrocracking reaction to proceed under the following hydrotreating conditions. A fluid mixture of product oil and gases was discharged through a lower part of the reactor, and the product oil was separated with a gas/liquid separator.

Feedstock Oil:
  Kind of oil: cycle oil from catalytic cracking unit (LCO)
  Aromatic hydrocarbon compound content: 56.9 mass %
  Density (15/4° C.): 0.8935
  Sulfur content: 0.15 mass %
  Nitrogen content: 0.03 mass %
  Distillation characteristics: initial boiling point, 163° C.; 10% point, 198° C.; 30% point, 229° C.; 50% point, 305° C.; 70% point, 310° C.; 90% point, 342° C.; end point, 369° C.

Hydrotreating Conditions:
  Reaction temperature: 410° C.
  Pressure (hydrogen partial pressure): 7.0 MPa
  Liquid hourly space velocity (LHSV): 1.0 hr$^{-1}$
  Conditions of hydrocracking for and after the preceding desulfurization catalyst
  Hydrogen/hydrocarbon ratio: 600 Nm$^3$/kL The values of distillation characteristics of the feedstock oil (LCO) were measured in accordance with JIS K 2254, and the value of aromatic content thereof was measured in accordance with the method JPI-5S-33-90 (gas chromatography method) provided for by The Japan Petroleum Institute.

The results of the hydrocracking were analyzed by the following methods.

The product oil was recovered on the 20th day and 50th day after initiation of the reaction. A gasoline fraction (boiling point range, 30-180° C.) was recovered from each kind of product oil by distillation apparatus of batch type (tank capacity, 500 mL), and the weight thereof was measured. The yield of the gasoline fraction was determined using the following equation, and the value thereof is shown in Table 3.

Yield of gasoline fraction (mass %)=(amount of gasoline fraction obtained by distillation (in terms of mass))/(amount of hydrocarbon feedstock oil introduced into the reactor (in terms of mass))×100

The values of RON of the gasoline fractions recovered from the product oil, the values being shown in Table 3, were measured in accordance with JIS K 2280, and the values of sulfur content thereof were measured in accordance with JIS K 2541. The values of the yield of xylene fraction each were measured by determining the xylene fraction content of the gasoline fraction by means of a gas chromatograph equipped with an FID and calculating the yield using the following equation. The term xylene fraction herein is defined as ethylbenzene and m-, p-, and o-xylenes.

Yield of xylene fraction (mass %)=(amount of gasoline fraction obtained by distillation (in terms of mass))×(proportion of xylene fraction)/(amount of hydrocarbon feedstock oil introduced into the reactor (in terms of mass))×100

TABLE 3

| | Results of hydrocracking reaction | | | | | |
|---|---|---|---|---|---|---|
| | 20th day after initiation of reaction | | 50th day after initiation of reaction | | | |
| | | | | | Gasoline fraction | |
| Catalyst | Yield of gasoline fraction (mass %) | Yield of xylene fraction (mass %) | Yield of gasoline fraction (mass %) | Yield of xylene fraction (mass %) | RON | Sulfur content (mass ppm) |
| A | 48 | 4.8 | 47 | 5.3 | 90 | 9 |
| B | 54 | 5.9 | 52 | 5.7 | 90 | 8 |
| C | 57 | 6.3 | 55 | 5.9 | 90 | 8 |
| D | 58 | 6.5 | 57 | 6.8 | 92 | 9 |
| E | 57 | 6.8 | 54 | 6.5 | 92 | 8 |
| F | 60 | 6.0 | 59 | 6.9 | 91 | 8 |
| G | 62 | 4.2 | 60 | 4.2 | 88 | 7 |
| H | 55 | 6.4 | 52 | 6.3 | 92 | 7 |
| a | 35 | 2.9 | 29 | 2.3 | 86 | 11 |
| b | 45 | 3.6 | 28 | 2.5 | 86 | 13 |
| c | 43 | 3.4 | 28 | 2.2 | 84 | 12 |
| d | 41 | 3.4 | 29 | 2.4 | 85 | 23 |

As apparent from Table 3, a gasoline fraction and a xylene fraction are stably obtained in high yields over a long period when catalysts A to H of the invention are used. Furthermore, when petroleum-derived hydrocarbon oil having a high aromatic hydrocarbon compound content is used as a feedstock, a gasoline fraction having an octane number of 88 or higher and a sulfur content of 10 ppm by mass or less is obtained and a xylene fraction, which is useful as a petrochemical feedstock, is also yielded, as in the Examples.

Incidentally, Comparative Example 6 (comparative catalyst d) was given as a Comparative Example because this Comparative Example does not meet a requirement for catalyst according to the invention (requirement concerning the content of a metal having hydrotreating activity) although the Comparative Example satisfies the requirements concerning support according to the invention.

While the invention has been described in detail and with reference to specific embodiments thereof, it will be apparent to one skilled in the art that various changes and modifications can be made therein without departing from the spirit and scope thereof. This application is based on a Japanese patent application filed on Aug. 21, 2009 (Application No. 2009-192087), the contents thereof being incorporated herein by reference.

INDUSTRIAL APPLICABILITY

The catalyst employing the support for a hydrocracking catalyst according to the invention has a long catalyst life and high hydrocracking activity and enables feedstock oil containing aromatic hydrocarbon compounds in a large amount to be hydrocracked. An increased number of kinds of feedstock oil can be treated with the catalyst, which contributes to an improvement in the efficiency of the step of refining in refineries. The product oil obtained include a high-quality gasoline fraction having a high octane number and petrochemical feedstocks, e.g., xylene, and the catalyst has a considerable technical significance.

The invention claimed is:

1. A support for hydrocracking catalyst of hydrocarbon oil, which consists essentially of a modified zeolite obtained by incorporating titanium into an ultra stabilized Y zeolite (USY), wherein the modified zeolite satisfies the followings (a) to (e):
   (a) the modified zeolite has a titanium content of 1-17% by mass in terms of metal oxide amount,
   (b) the modified zeolite contains aluminum and silicon in an Al/Si atomic ratio of 0.14-0.35,
   (c) the modified zeolite has a lattice constant of 24.36-24.48 Å,
   (d) the modified zeolite has a degree of crystallinity of 30-95%, and
   (e) the modified zeolite has a specific surface area of 500-850 $m^2/g$.

2. A catalyst for hydrocracking of hydrocarbon oil, which comprises: the support according to claim 1; and at least one selected from Group 8 metals and Group 6 metals of the long-form periodic table in an amount of 0.5-30% by mass in terms of metal oxide amount based on the catalyst.

3. A method for hydrocracking of hydrocarbon oil, which comprises hydrocracking hydrocarbon oil which has a boiling-point range of 120-380° C. and comprises aromatic hydrocarbon compounds in an amount of 30-100% by mass, by contacting the hydrocarbon oil with the hydrocracking catalyst according to claim 2.

* * * * *